US008880933B2

(12) United States Patent
Bhagwan et al.

(10) Patent No.: US 8,880,933 B2
(45) Date of Patent: Nov. 4, 2014

(54) LEARNING SIGNATURES FOR APPLICATION PROBLEMS USING TRACE DATA

(75) Inventors: Ranjita Bhagwan, Bangalore (IN); Venkata N. Padmanabhan, Bangalore (IN); Bhavish Aggarwal, Bangalore (IN); Lorenzo De Carli, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 597 days.

(21) Appl. No.: 13/080,393

(22) Filed: Apr. 5, 2011

(65) Prior Publication Data

US 2012/0260141 A1 Oct. 11, 2012

(51) Int. Cl.
*G06F 11/00* (2006.01)
*G06N 5/02* (2006.01)
*H04L 12/24* (2006.01)
*G06F 11/16* (2006.01)
*G06F 11/07* (2006.01)
*H04L 12/26* (2006.01)

(52) U.S. Cl.
CPC .......... *G06N 5/025* (2013.01); *G06F 11/1658* (2013.01); *G06F 11/079* (2013.01); *H04L 43/04* (2013.01); *H04L 41/0636* (2013.01)
USPC ................ 714/4.11; 714/25; 714/2

(58) Field of Classification Search
USPC ................................................ 714/37, 45
See application file for complete search history.

(56) References Cited

U.S. PATENT DOCUMENTS

| 2005/0172027 | A1* | 8/2005 | Castellanos et al. .......... 709/229 |
| 2009/0323516 | A1 | 12/2009 | Bhagwan et al. |
| 2010/0014420 | A1 | 1/2010 | Wang et al. |
| 2010/0064131 | A1 | 3/2010 | Spatscheck et al. |
| 2010/0153316 | A1 | 6/2010 | Duffield et al. |
| 2012/0066547 | A1* | 3/2012 | Gilbert et al. ................... 714/26 |

OTHER PUBLICATIONS

Feng, Jian., "Research on the Technology of Peer-to-Peer Traffic Classification", Retrieved at <<http://ieeexplore. ieee.org/stamp/stamp.jsp?tp=&arnumber=5533749>>, International Symposium on Computer Communication Control and Automation, May 5-7, 2010, pp. 491-494.

(Continued)

*Primary Examiner* — Sarai Butler
(74) *Attorney, Agent, or Firm* — Steve Wight; Judy Yee; Micky Minhas

(57) ABSTRACT

The problem signature extraction technique extracts problem signatures from trace data collected from an application. The technique condenses the manifestation of a network, software or hardware problem into a compact signature, which could then be used to identify instances of the same problem in other trace data. For a network configuration, the technique uses as input a network-level packet trace of an application's communication and extracts from it a set of features. During the training phase, each application run is manually labeled as GOOD or BAD, depending on whether the run was successful or not. The technique then employs a learning technique to build a classification tree not only to distinguish between GOOD and BAD runs but to also sub-classify the BAD runs into different classes of failures. Once a classification tree has been learned, problem signatures are extracted by walking the tree, from the root to each leaf.

20 Claims, 5 Drawing Sheets

(56) References Cited

OTHER PUBLICATIONS

Ding, et al., "Automatic Software Fault Diagnosis by Exploiting Application Signatures", Retrieved at <<http://www.cse.ohio-state.edu/hpcs/WWW/HTML/publications/papers/TR-08-5.pdf>>, Proceedings of the 22nd conference on Large installation system administration conference, 2008, pp. 23-39.

Tavallaee, et al., "Automatic Discovery of Network Applications: A Hybrid Approach", Retrieved at <<http://ebagheri.athabascau.ca/papers/cai2010.pdf>>, Proceedings of 23rd Canadian Conference on Artificial Intelligence, May 31-Jun. 2, 2010, pp. 208-219.

Su, et al., "Automatically Generating Predicates and Solutions for Configuration Troubleshooting", Retrieved at <<http://www.usenix.org/event/usenix09/tech/full_papers/su/su.pdf>>, Proceedings of the conference on USENIX Annual technical conference, 2009, pp. 13.

Aggarwal, et al., "NetPrints: Diagnosing Home Network Misconfigurations using Shared Knowledge", Retrieved at <<http://research.microsoft.com/pubs/78399/netprintspdtpdf>>, Proceedings of the 6th USENIX symposium on Networked systems design and implementation, 2009, pp. 16.

Ashok, et al., "DebugAdvisor: A Recommender System for Debugging", Retrieved at <<http://research.microsoft.com/pubs/101301/camerareadycopy.pdf>>, Proceedings of the the 7th joint meeting of the European software engineering conference and the ACM SIGSOFT symposium on the foundations of software engineering, Aug. 24-28, 2009, pp. 10.

Ha, et al., "Improved Error Reporting for Software that Uses Blackbox Components", Retrieved at <<http://www.cs.utexas.edu/~indrajit/pubs/clarify-pldi07.pdf>>, Proceedings of the 2007 ACM SIGPLAN conference on Programming language design and implementation, Jun. 11-13, 2007, pp. 11.

Kandula, et al., "Detailed Diagnosis in Computer Networks", Retrieved at <<http://research.microsoft.com/apps/pubs/default.aspx?id=80590>>, Aug. 17, 2009, pp. 12.

Kannan, et al., "Semi-Automated Discovery of Application Session Structure", Retrieved at <<http://mistlab.csail.mit.edu/papers/p12-kannan.pdf>>, Proceedings of the 6th ACM SIGCOMM conference on Internet measurement, Oct. 25-27, 2006, pp. 13.

Moore, et al., "Toward the Accurate Identification of Network Applications", Retrieved at <<http://www.cl.cam.ac.uk/research/srg/netos/nprobe/publications/2005-moore2005toward.pdf>>, In the Proceedings of Sixth Passive and Active Measurement Workshop, Mar./Apr. 2005, pp. 14.

Wang, et al., "Automatic Misconfiguration Troubleshooting with PeerPressure", Retrieved at <<http://www.usenix.net/events/osdi04/tech/full_papers/wang/wang.pdf>>, 6th Symposium on Operating Systems Design and Implementation, 2004, pp. 245-257.

Wang, et al., "STRIDER: A Black-box, State-based Approach to Change and Configuration Management and Support", Retrieved at <<http://reference.kfupm.edu.sa/content/s/t/strider_a_black_box_state_based_approa_15587.pdf>>, Proceedings of the 17th USENIX conference on System administration, 2003, pp. 165-178.

Wright, et al., "On Inferring Application Protocol Behaviors in Encrypted Network Traffic", Retrieved at <<http://jmlr.csail.mit.edu/papers/volume7/wright06a/wright06a.pdf>>, The Journal of Machine Learning Research, vol. 7, 2006, pp. 2745-2769.

Yuan, et al., "Automated Known Problem Diagnosis with Event Traces", Retrieved at <<http://jotun.cs.kuleuven.be/conference/EuroSys2006/papers/p375-yuan.pdf>>, Proceedings of the 1st ACM SIGOPS/EuroSys European Conference on Computer Systems, Apr. 18-21, 2006, pp. 375-388.

Krishnamurthy, et al., "Sketch-based Change Detection: Methods, Evaluation, and Applications", Retrieved at <<http://conferences.sigcomm.org/imc/2003/papers/p305-krishnamurthy11111.pdf>>, Proceedings of the 3rd ACM SIGCOMM conference on Internet measurement, Oct. 27-29, 2003, pp. 14.

"Microsoft network monitor", Retrieved at <<http://www.microsoft.com/downloads/en/details.aspx?FamilyID=983b941d-06cb-4658-b7f6-3088333d062f>>, p. 2, Jun. 24, 2010.

Kushman, et al., "WikiDo", Retrieved at http://citeseerx.ist.psu.edu/viewdoc/download:jsessionid=4ADF4A7C4D1A76D815EE04D6E770B035?doi=10.1.1.162.1104&rep=rep1&type=pdf>>, pp. 6, Oct. 2009.

\* cited by examiner

LEARNING SIGNATURES FOR APPLICATION PROBLEMS USING TRACE DATA

BACKGROUND

Network communication is an integral part of many software and hardware applications. Therefore, network problems often impact application behavior. The impact on network communication depends on the nature of the problem. For example, if a local name server is down, Domain Name System (DNS) requests will be sent but no responses will be received. On the other hand, if a firewall at the edge of a corporate network is blocking a Hypertext Transfer Protocol Secure (HTTPS) port, then TCP SYN packets will be seen but not any corresponding SYN/ACK packets.

Since application problems can be the result of many different failures, sometimes in combination, it can often be difficult for a common user, or even a specialist, to ascertain what the cause of a problem is and how to correct it.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The problem signature extraction technique described herein is aimed at developing signatures for types of application executions using trace data. In one embodiment, the technique fingerprints a problem with a signature, say based on network traffic features, to recognize a new problem as essentially matching a previously-seen problem, a fix for which might already be known.

In one embodiment, the technique extracts problem signatures from trace data collected from a network, software or hardware application. The technique condenses the manifestation of a network, software or hardware problem into a compact signature, which can then be used to match one or more instances of the same problem in other trace data. Each signature encapsulates the symptoms corresponding to a particular problem.

In one embodiment, for a network configuration, the problem signature extraction technique uses as input a network-level packet trace of an application's communication and extracts from it a set of features. During the training phase, the application is repeatedly executed and each application execution or run is manually labeled as GOOD or BAD, depending on whether the run was successful or not. The technique then employs a learning technique to build a classification tree not only to distinguish between GOOD and BAD runs but to also sub-classify the BAD runs, revealing different classes of failures. The technique, in performing the sub-classification does not require any failure class-specific labels. Once a classification tree has been learned, problem signatures are extracted simply by walking the tree, from the root down to each leaf. These problem signatures can then be used, for example, to determine fixes to the problem or problems identified.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
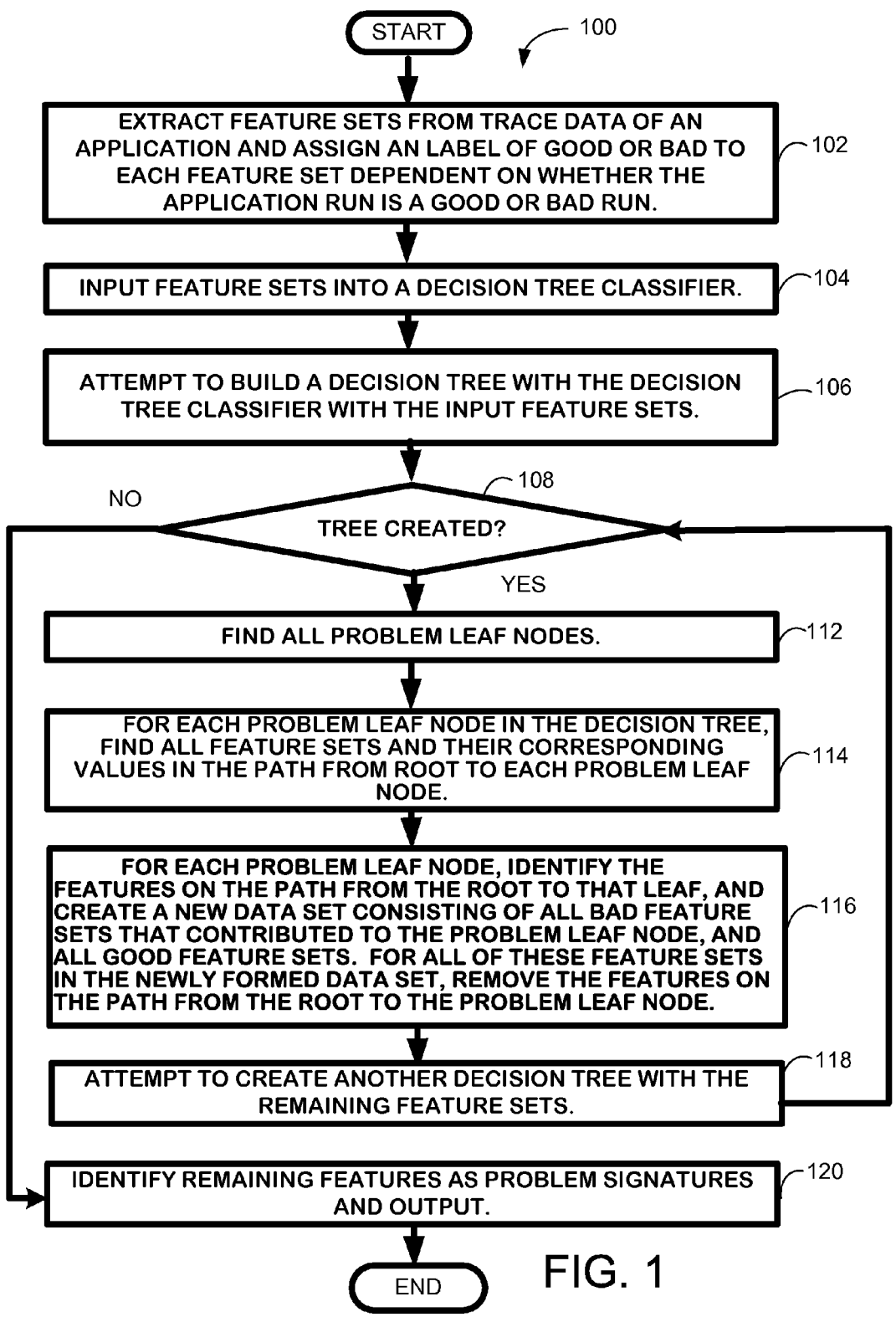
FIG. 1 depicts a flow diagram of an exemplary process of the problem signature extraction technique described herein.

In the following description of the problem signature extraction technique, reference is made to the accompanying drawings, which form a part thereof, and which show by way of illustration examples by which the problem signature extraction technique described herein may be practiced. It is to be understood that other embodiments may be utilized and structural changes may be made without departing from the scope of the claimed subject matter.

1.0 Problem Signature Extraction Technique

The following sections provide an overview of the problem signature extraction technique, as well as exemplary processes and an exemplary architecture for practicing the technique. Details of various embodiments of the problem signature extraction technique, as well as an example of extracting problem signatures, are also provided.

1.1 Overview of the Technique

The problem signature extraction technique described herein uses a learning-based approach to construct signatures for application problems, such as, for example, network problems or other software and hardware problems found in applications. In one embodiment, the technique extracts a set of features from packet traces. The features extracted in one embodiment correspond to protocols such as DNS, Internet Protocol (IP), Transport Control Protocol (TCP), HTTP, and so forth. For instance, there are features corresponding to the presence of a DNS request, DNS reply, HTTP error code, and so forth.

Once these features have been extracted, designing a procedure to learn problem signatures is a challenge. A standard classification approach, such as decision trees, generally requires labeled training data. Generating a training set with problem type-specific labels is onerous and can even be infeasible when the failure cause for a training run is unknown (e.g., a failure could occur in a remote network component). At the same time, an unsupervised learning approach, such as clustering, is vulnerable to noisy data. For instance, features extracted from unrelated background traffic might still get picked for clustering.

To address this challenge, the problem signature extraction technique employs a novel approach. For training, the technique only assumes coarse-grained labels: GOOD when the training run of an application was successful and BAD otherwise. These labels can be determined with relative ease based on the exhibited behavior of an application, without the need to know, in the case of BAD, the problem sub-category. It should be noted that while coarse-grained labels of GOOD and BAD are used in this description, many other types of coarse-grained labels could be used in order to coarsely distinguish application runs.

Then, to construct signatures, the problem signature extraction technique proceeds in a hierarchical manner. It first employs a decision tree based classifier to learn the features that are best able to distinguish between the GOOD and BAD runs. The path from the root to each leaf node, GOOD or BAD, then defines part of the problem signature. The task, then, is to sub classify each BAD leaf node B corresponding to the different sub-categories of failures, despite not having labels corresponding to each sub-category. For each BAD leaf node the technique takes the corresponding BAD runs and all GOOD runs, prunes features that have already been included as part of the signature, and runs the decision tree classifier again. This step yields the next best set of features to distinguish between the BAD nodes considered and the GOOD nodes. These features are then added to the signature. This new classification tree is attached to the original tree at the BAD node, B. This process then continues until the classifier does not learn a decision tree any more. In the final classification tree, the set of features on the path from the root node to a BAD leaf node yields a signature for the corresponding category of failures. It should be noted that meta data can also optionally be added to a signature, for example, to identify what type of problem the signature represents or to identify fixes to the problem the problem signature represents.

The effectiveness of working embodiments of the problem signature extraction technique were evaluated by generating problem signatures for two classes of applications: multiple web browsers and an email client. For each application, a training set was generated by creating various error conditions. Similarly a test set was generated. It was found that the problem signatures constructed by the problem signature extraction technique based on the training set was able to classify the traces in the test set with 95% accuracy. In fact, the classification performed by the problem signature extraction technique using just the GOOD and BAD labels was within 4.5% accuracy to that by a decision tree classifier operating with the benefit of problem category labels attached to traces. It was also shown that the problem signature extraction technique's signatures were successful in helping a human administrator match network packet traces to problems.

Working prototypes of two applications were built on the problem signature extraction technique. One is a tech support application (help desk application), which maintains notes for each problem, detailing the resolution steps. These notes are indexed by problem signature so that when a problem is encountered, the technique can quickly search for the notes corresponding to matching problems seen in the past. The other application is a search tool that quickly finds instances of a specified problem in a large packet trace. Basically, the tool scours through slices of the trace data looking for a signature matching that of the specified problem. Additionally, the technique could be used in a network health monitoring tool that listens to network traffic and monitors the failures experienced by various applications.

1.3 Exemplary Processes

FIG. 1 depicts an exemplary computer-implemented process 100 for automatically learning problem signatures for an application using trace data from good executions and bad executions of the application. For example, this trace data could be traces of application, system or network events. As shown in block 102, feature sets are extracted from the trace data and a coarse label of GOOD is assigned to each feature set for good executions of the application and a coarse label of BAD is assigned to each feature set for bad executions of the application. As shown in block 104, the coarsely labeled feature sets for the trace data are input into a decision tree classifier. An attempt is made to build a decision tree that categorizes problem signatures, each signature identifying a type of problem with the application from trace data for bad executions of the application, as shown in block 106. As shown in block 108, 110 if the decision tree classifier yields a decision tree, all problem leaf nodes in the decision tree are found (block 112). For each problem leaf node in the decision tree all feature sets and their corresponding values in the path from root to each problem leaf node are found, as shown in block 114. As shown in block 116, for each problem leaf node the features on the path from the root to that leaf are identified. A new data set is created per problem leaf node, consisting of all BAD feature sets that contributed to the problem leaf node, and all GOOD feature sets. For all these feature sets in the newly formed data set, the features on the path from the root to the problem leaf node are removed. An attempt is made to build a decision tree with the remaining feature sets, as shown in block 118. Blocks 108 through 118 are repeated until the decision tree classifier does not yield a decision tree. Each path from root to leaf of the aggregate tree formed by this iterative procedure is then identified as a problem signature, and the identifying problem signatures are output to be used for identify problems with the execution of the application, as shown in block 120.

Figure 2:
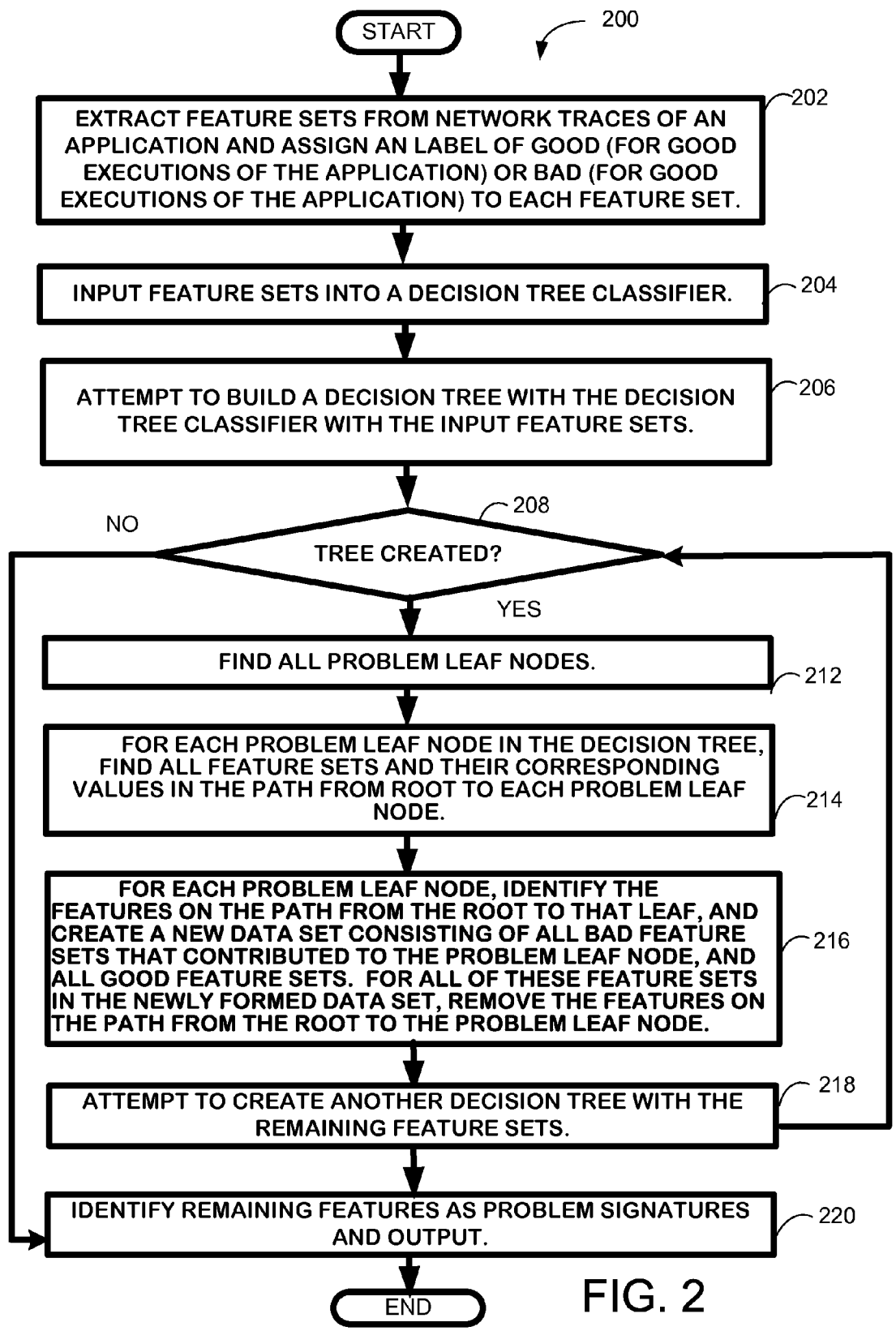
FIG. 2 depicts a flow diagram of another exemplary process of the problem signature extraction technique described herein.

FIG. 2 depicts another exemplary computer-implemented process 200 for implementing the technique. This embodiment is suited for applications running on a network and automatically learns problem signatures for one or more applications running on a network by using network traces. As shown in block 202, feature sets are extracted from the network traces and a coarse label of GOOD or BAD is assigned to each feature set for good and bad network traces of the application, respectively, as shown in block 204. More specifically, the coarsely labeled feature sets for the trace data are input into a decision tree classifier. An attempt is made to build a decision tree that categorizes problem signatures, each signature identifying a type of problem with the application from trace data for bad executions of the application, as shown in block 206. As shown in block 208, if the decision tree classifier yields a decision tree, all problem leaf nodes in the decision tree are found (block 210) and for each problem leaf node in the decision tree all feature sets and their corresponding values in the path from root to each problem leaf node are found, as shown in block 212. As shown in block 214, a new data set is created per problem leaf node, consisting of all BAD feature sets that contributed to the problem leaf node, and all GOOD feature sets. For all these feature sets in the newly formed data set, the features on the path from the root to the problem leaf node are removed. An attempt is made to build a decision tree with the remaining feature sets, as shown in block 216. Blocks 208 through 218 are repeated until the decision tree classifier does not yield a decision tree. Each path from root to leaf of the aggregate tree formed by this iterative procedure is then identified as a problem signature, and the identified problem signatures are output to be used for identifying problems with the execution of the application, as shown in block 220.

1.4 Exemplary Architecture

Figure 3:
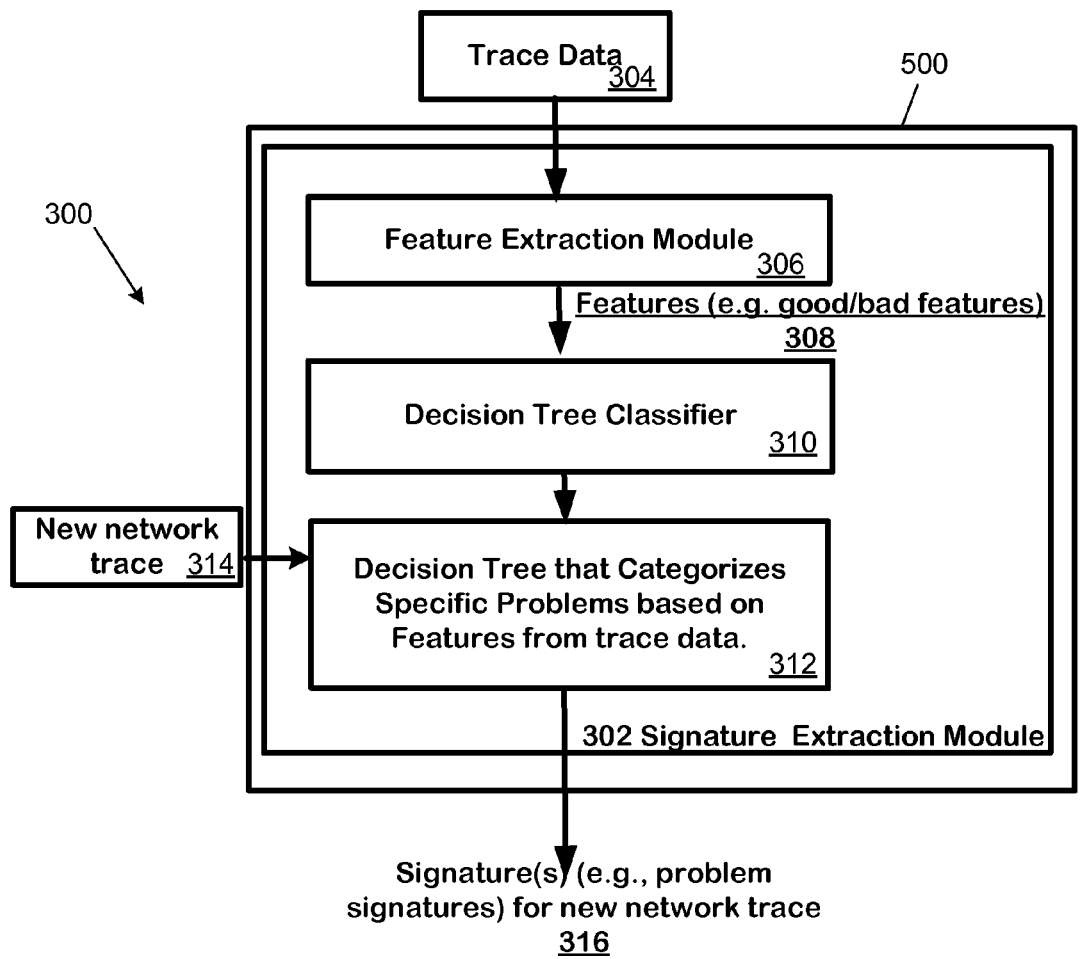
FIG. 3 is an exemplary architecture for practicing one exemplary embodiment of the problem signature extraction technique described herein.

FIG. 3 shows an exemplary architecture 300 for employing the problem signature extraction technique. In general, this architecture 300 has a module 306 for identifying and extracting features from traces 304 of different types of application executions and uses the identified features from the traces to construct signatures 316 for the different types of application executions. More specifically, in one embodiment, this exemplary architecture 300 includes a problem signature extraction module 302 that resides on a general purpose computing device 500, which will be discussed in greater detail with respect to FIG. 5. Traces 304 of an application's communications is input into a feature extraction module 306. A set of features 308 is extracted from the traces 304 with features of good executions of the application labeled as GOOD and features of bad executions of the application labeled as BAD. The set of features labeled as GOOD and BAD are used to build a decision (e.g., signature) tree 312 that distinguishes between good and bad executions of the application and that also sub-classifies the bad executions into specific problem categories. Then, the decision (e.g., signature) tree is used to classify a problem from a newly input network-level packet trace 314 into a specific problem category identified by its corresponding problem signature 316.

1.5 Details of Exemplary Embodiments of the Problem Signature Extraction Technique Exemplary processes and an exemplary architecture having been discussed, the following sections provide details of various embodiments of the problem signature extraction technique.

As discussed previously, the input to the problem signature extraction technique is a set of network packet traces, each coarsely labeled as GOOD or BAD. A GOOD trace corresponds to a working application run while a BAD trace corresponds to a run that includes some type of failure or problem with the execution of the application. In one embodiment, the GOOD/BAD labeling is manually performed based on domain knowledge. The coarsely-labeled traces are fed to the problem signature extraction technique's feature extractor, which uses domain knowledge to extract a set of features. These feature sets, together with the GOOD/BAD labels, are then fed to the problem signature extraction technique's signature construction module, as discussed previously. Although it is just given the coarse GOOD/BAD labels as input, the technique infers a sub-categorization of BAD corresponding to the different categories of problems that an application encounters.

Finally, once the problem signature extraction technique has learned and associated signatures with problems, these can be used in a range of applications, helping to match the problems in a data trace to ones that have previously been seen and assigned signatures.

1.5.2 Features Extracted from Traces

In this section the information the technique extracts from the raw network traces and inputs to the problem signature extraction technique is described. As with any machine learning algorithm, the technique employs as input a set of features. The feature set extraction module reduces trace data (e.g., a network packet trace) to a compact set of features that summarizes the essential characteristics of the trace. This process also makes the input to the technique less noisy and strips it of privacy sensitive information (e.g., the actual packet payload).

The choice of features is an important consideration. Features that are too detailed often suffer from a lack of generality. For example, a feature corresponding to exact timing information or even one corresponding to relative ordering of multiple concurrent connections is likely to be too specific. Such features might vary significantly from across multiple runs of an application. Hence the technique avoids extracting such detailed features except in the case of site-specific signatures discussed below.

In one embodiment of the problem signature extraction technique, the following broad categories of features were extracted from network packet traces: packet types, sequences and aggregated features. These are described in the paragraphs below.

Packet Types:

Often, network problems manifest themselves as the presence or absence of packets of a certain type. To capture this, the technique uses binary features to record the presence or absence of certain packet types, where type is determined based on the packet header fields. By examining the headers of the packets contained in a trace, in one embodiment the technique sets the corresponding binary features in the feature set for the trace. For example, if a packet header indicates that it is an HTTP 200 Response (HTTP OK), the technique sets the binary feature HTTP200 RESPONSE to 1. If no HTTP 200 Response is present in the trace, this feature is set to 0. The technique also sets a special feature, NO HTTP RESPONSE, to 1 if no HTTP response of any kind exists in the trace.

Sequence:

The presence or absence of a particular sequence of packets in a trace could also be symptomatic of a network problem. For example, a faulty trace might contain a TCP SYN packet but no corresponding TCP SYN/ACK packet, which might be indicative of a problem. To capture such effects, composite binary features are defined, for example, a feature corresponding to the sequence TCP SYN ! TCP SYNACK. The technique sets this feature to 1 if and only if a TCP SYN is followed by a TCP SYNACK on the same connection. In all other cases, including when no TCP SYN is seen, it is set to 0. Domain knowledge can be used to trim the set of such composite features. For example, the sequence TCP RST!TCP SYN is not meaningful and therefore it is not necessary to record it.

Aggregate Features:

The technique also extracts aggregate features corresponding to the number of successful TCP connections, the number of successful HTTP connections, the number of bytes transferred, and so forth. These features are particularly useful in the context of site-specific problem signatures, which correspond to particular (for instance, popular) remote sites or services. For example, the www.cnn.com webpage has specific characteristics in terms of its layout and the number of objects on the page. The aggregate features can thus help capture the problem symptoms specific to this site. Also, the popularity of this site might make it worthwhile to learn site-specific signatures for it.

In one working implementation of the technique, feature extractors for 12 protocols were written using Microsoft® Corporation's Network Monitor's Parser API. Table 1 shows the set of protocols and the number of features captured from each protocol for this implementation. For each application, a subset of these protocols was chosen to determine what features to extract. Feature extractors for some protocols take as input a port number so that they extract features specific to traffic to and from that port. For example, when analyzing traces from browsers, this embodiment of the technique extracts TCP-level features specific to port 80.

TABLE 1

Number of Features for Each Protocol.

| Protocol | No. of Features |
|---|---|
| ARP | 3 |
| DNS | 4 |
| HTTP | 42 |
| IKE/AUTHIP | 4 |
| IP | 1 |
| LLMNR | 4 |
| NBNS | 4 |
| RWS | 4 |
| SMB/SMB2 | 45 |
| TCP | 48 |
| TLS | 10 |
| UDP | 52 |

1.5.3 Building a Signature Tree of Problem Signatures

As discussed previously, the problem signature extraction technique is used to identify signatures corresponding to various problems experienced by an application. The technique takes as input the sets of features from multiple application runs, each of which is labeled as GOOD (if the run was successful) or BAD (if the run was unsuccessful). A key challenge is to work with these coarse labels to decompose the set of BAD runs into meaningful categories corresponding to the different problems experienced by the application.

This challenge sets the problem apart from standard problems of classification and clustering in machine learning. Unlike with classification, the categories of faults are not known in advance and hence one does not have (fine-grained) labels corresponding to the categories. Unlike with clustering, the coarse-grained GOOD/BAD labels do matter since a goal, specifically, is to sub-categorize the BAD runs. In contrast, clustering of the BAD runs to find categories might bunch together runs based on some extraneous features (e.g., the presence or absence of background noise). These extraneous features may be similarly present or absent in GOOD runs too, which means they are, in essence, inconsequential and should have no bearing on categorizing different kinds of BAD runs.

The problem signature extraction technique algorithm employs an iterative approach to building a signature tree. In one embodiment of the technique, the first step is to simply build a decision tree to perform GOOD/BAD classification using the standard C4.5 decision tree classifier. This procedure yields at least one GOOD leaf node and at least one BAD leaf node. The path from the root to each BAD leaf yields a (partial) signature.

Next, to sub-categorize a BAD leaf node, and thereby extend the signature, the technique considers all the GOOD runs and just the BAD runs corresponding to the leaf node in question.

Disregarding the features that are already part of the decision tree above, the technique feeds these runs into the decision tree classifier. The goal is to identify a novel set of features that help distinguish between GOOD and BAD, even if not as effectively as the features considered in the original decision tree above. Since these help distinguish GOOD from BAD, such features are likely to be meaningful, avoiding the pitfall of a clustering approach that might pick extraneous features.

The features in the second decision tree above would often, though not always, also help sub-classify the original BAD leaf node, by yielding multiple new BAD leaf nodes. In such a case, the new decision tree is attached to the original decision tree at the parent BAD leaf node.

This process of growing new decision trees at BAD leaf nodes is repeated until the decision tree classifier is unable to learn any new trees.

In the end, the technique is left with a stacking of decision trees. The BAD leaf nodes correspond to the different problem cases and the features along the path from the root to the BAD leaf node yield the corresponding signature. Note that such a stacking of decision trees is not a decision tree by itself and cannot be used for GOOD/BAD classification. This is because all GOOD runs are added in at each stage to tease out additional features. The stacking of decision trees is termed as a signature tree.

1.5.6 Example

Figure 4:
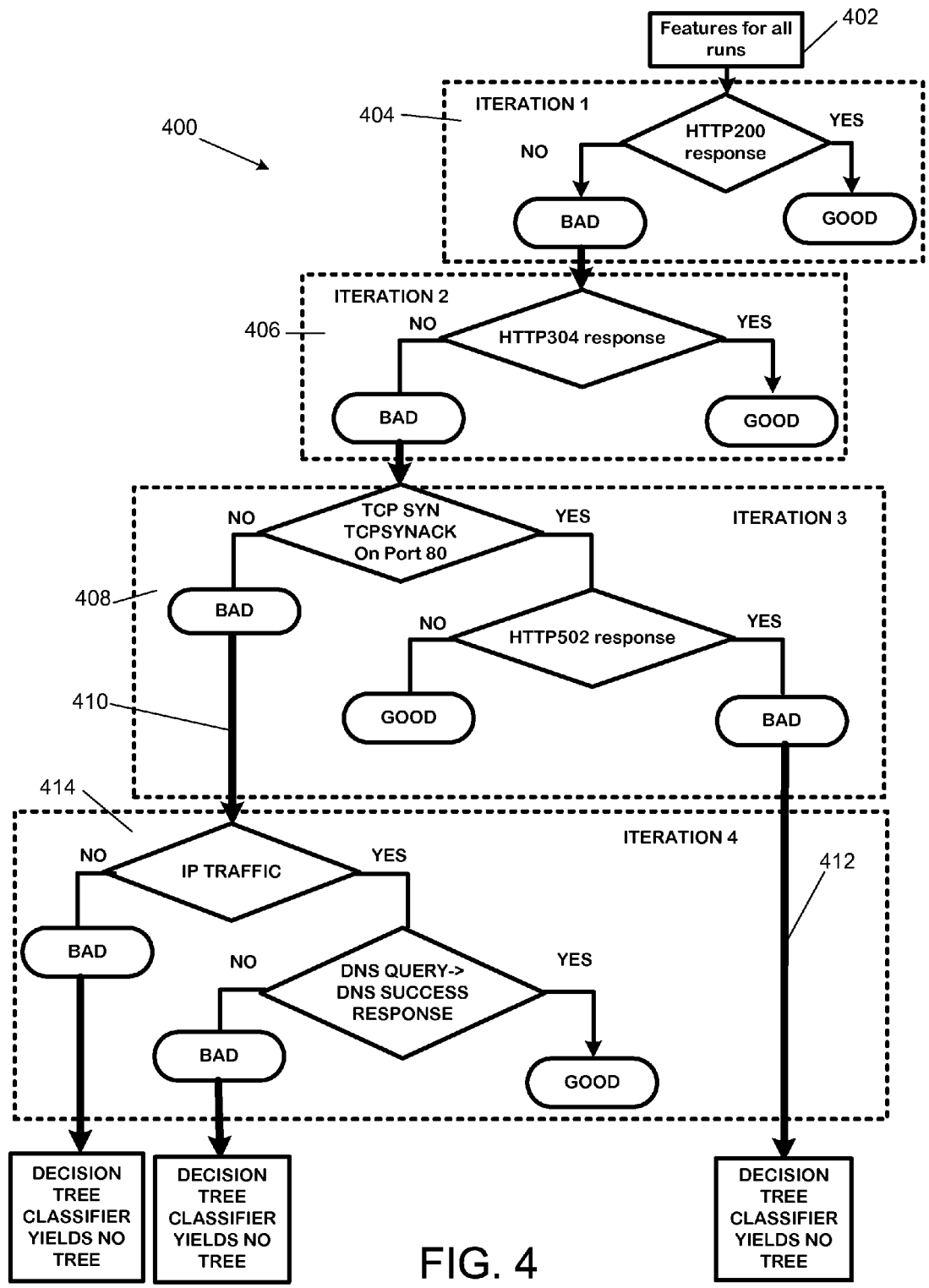
FIG. 4 provides an example of extracting problem signatures in one embodiment of the problem signature extraction technique.

The operation of an exemplary embodiment of the problem signature extraction technique is explained by demonstrating how an example signature tree is constructed for a browser application. FIG. 4 shows the signature tree 400. In the first iteration, the problem signature extraction technique inputs the feature sets 402 corresponding to all runs, labeled GOOD or BAD, to a decision tree classifier (e.g., a C4.5 decision tree classifier). The classifier outputs the tree 404 shown within the box titled "Iteration 1" in FIG. 4. This tree tells that:
If a trace does not have an HTTP 200 Response, it is BAD.

While this statement tells something about a generic symptom that all the bad traces have, it does not help categorize the bad traces into different sub-categories or problems. So, the technique forces the decision tree classifier to learn an alternative way of classifying the bad traces by removing the HTTP200 RESPONSE feature from all good and bad traces, and inputting the pruned feature sets to the decision tree classifier (e.g. C4.5) in Iteration 2. The output of this iteration is shown in the box marked "Iteration 2" 406 in FIG. 4. This tells us that:
If the trace does not have an HTTP 304 Response, it is BAD.

However, in this iteration too, the decision tree classifies all bad traces into one category because it found yet another (novel) feature that is common to all bad traces. Hence, for iteration 3, the technique removes the HTTP304 RESPONSE feature from all good and bad feature sets and learn a decision tree again. In iteration 3 (408), the tree has 2 leaf nodes labeled BAD:
If the trace has (a) no TCP SYN/SYNACK exchange on port 80, OR (b) has a TCP SYN/SYNACK exchange on port 80 AND an HTTP 502 Response (proxy error), it is BAD.

Hence, by iteratively removing features that exist in all BAD traces, the technique has succeeded in learning two different problem signatures and sub-categorizes the bad traces across them. The absence of a TCP connection characterizes the first signature 410, while an HTTP 502 response (proxy error) characterizes the second 412.

In iteration 4 (414), the technique divides the BAD feature sets into two categories: one each for the two leaves labeled BAD in Iteration 3 above. The first category has no TCP SYN/SYNACK exchange on port 80, whereas the second category does but also includes an HTTP 502 response.

With each category of BAD feature sets, the technique separately repeats the procedure described in the previous iterations.

Therefore, from the BAD feature sets in the first category as well as from all GOOD feature sets, the technique excludes the "TCP SYN ! TCP SYNACK on port 80" feature and then reruns the decision tree classifier (e.g., C4.5). On the other hand, from the BAD feature sets in the second category as well as from all GOOD feature sets, the technique excludes both the "TCP SYN ! TCP SYNACK on port 80" feature and the "HTTP 502 Response" feature, and then reruns the decision tree classifier (e.g., C4.5).

Iteration 4 for the first BAD category obtained in Iteration 3 gives us the tree shown in the box marked "Iteration 4" 414 in FIG. 4. This tree tells us that if the trace has no IP traffic, or if it has IP traffic but no Successful DNS Query, it is BAD.

The technique therefore splits the first BAD category from Iteration 3 into 2 sub-categories: the first has no IP traffic, and the second has IP traffic, but no successful DNS exchange. With these two sub-categories, the technique repeats the procedure described in Iteration 3 of splitting the BAD traces into two sets, removing the discerning features from them, removing the same features from all GOOD traces, and inputting this new data to decision tree classifier (e.g., C4.5).

Both these runs of the decision tree classifier (e.g., C4.5) yield trivial, one-node trees with no branches, which is the stopping condition for the problem signature extraction technique algorithm. Also, the second run of the decision tree classifier (e.g., C4.5) in iteration 4 (corresponding to the second BAD category obtained in Iteration 3) yields a trivial, one-node tree.

Hence, the signature tree is complete. Having completed the process of growing the signature tree, the technique now prunes the signatures to make them more concise. Note that this step is not necessary for correctness. However, in general, several features in signature tree constructed above could be redundant. For instance, in the example in FIG. 4, the inclusion of NO HTTP304 RESPONSE immediately following NO HTTP200 RESPONSE is redundant since it does not help sub-classify BAD. Hence, the technique removes redundant features such as HTTP304 RESPONSE from all signatures. The final list of problem signatures corresponding to FIG. 4 is:
1. NO HTTP200 RESPONSE AND TCPSYN80 ! TCPSYNACK80 AND HTTP502 RESPONSE
2. NO HTTP200 RESPONSE AND NO TCPSYN80 ! TCPSYNACK80 AND NO IP TRAFFIC
3. NO HTTP200 RESPONSE AND NO TCPSYN80 ! TCPSYNACK80 AND IP TRAFFIC AND NO DNS QUERY ! DNS SUCCESS RESPONSE These problem signatures are such that every bad trace matches only one signature. This characteristic is important in that it helps disambiguate between the seemingly large number of error conditions that occur in real-world applications.

If, instead of crafting these signatures through the technique, one were to use a simpler, rule-based problem signature matching scheme which included the following rules among others for example:
1. NO HTTP502 RESPONSE
2. NO HTTP401 RESPONSE
3. NO IP BACKGROUND TRAFFIC
one might not get the level of discernment that the problem signature extraction technique provides. For instance, a web browser trace could contain an HTTP 401 error (Unauthorized), but this is a common signal that the server uses to ask the user for a password. Once the user enters the password, the connection succeeds. This case demonstrates that just the presence of an HTTP 401 error does not necessarily indicate a problem.

The main steps of one embodiment of the problem signature extraction technique embodiment can be summarized in the following four steps:
Step 1: Extract all feature sets from the network traces, and assigns a label—either GOOD or BAD—to each feature set.
Step 2: Input the labeled feature sets to the decision tree classifier (e.g., C4.5 algorithm), which yields a decision tree.
Step 3: If decision tree classifier does not give a tree, stop. Else, find all BAD leaf nodes in the tree.
Step 4: For each BAD leaf, find all the features and their values in the path from root to the leaf. For all BAD feature sets that have these features and the same values, and for all GOOD feature sets, remove these features. With these reduced feature sets, start from Step 2 again.

2.0 Exemplary Operating Environments

Figure 5:
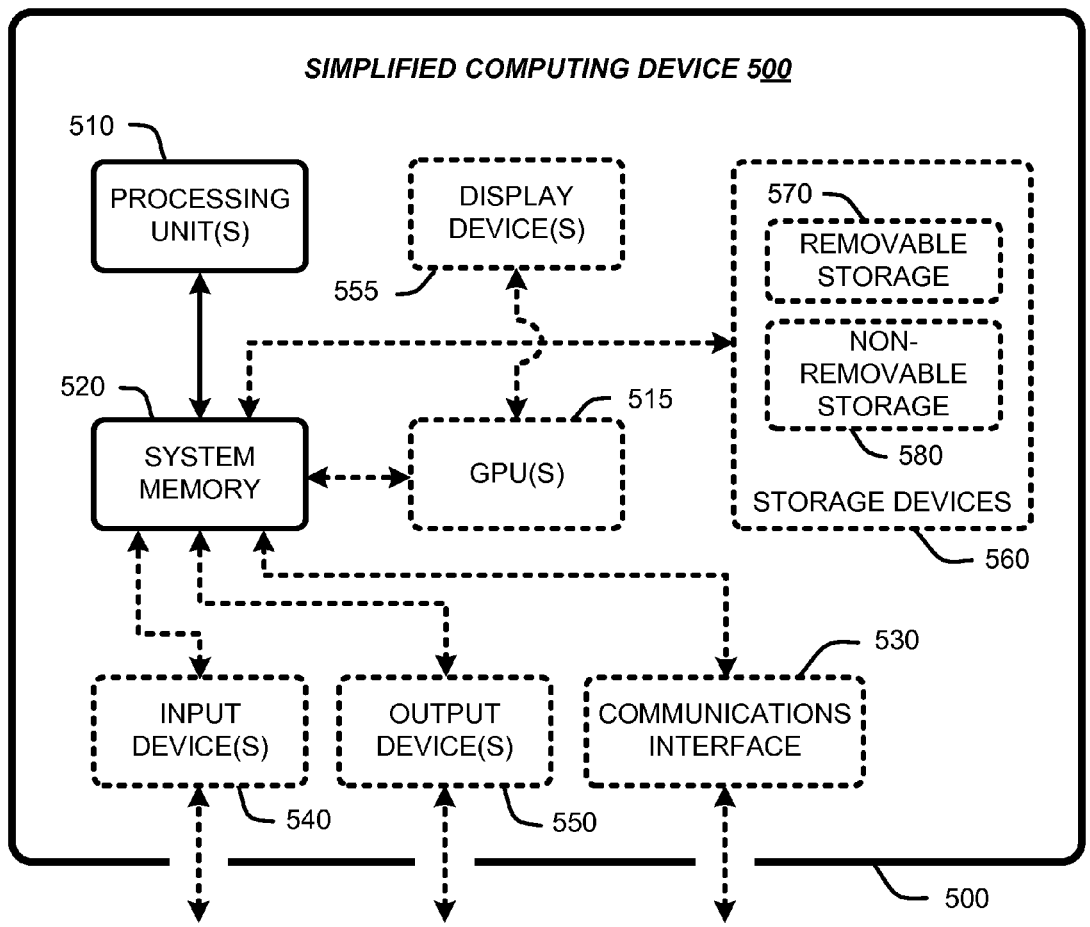
FIG. 5 is a schematic of an exemplary computing environment which can be used to practice the problem signature extraction technique.

The problem signature extraction technique described herein is operational within numerous types of general purpose or special purpose computing system environments or configurations. FIG. 5 illustrates a simplified example of a general-purpose computer system on which various embodiments and elements of the problem signature extraction technique, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 500. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the problem signature extraction technique, the device should have a sufficient computational capability and system memory to enable basic computational operations. In particular, as illustrated by FIG. 5, the computational capability is generally illustrated by one or more processing unit(s) 510, and may also include one or more GPUs 515, either or both in communication with system memory 520. Note that that the processing unit(s) 510 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540 (e.g., pointing devices, keyboards, audio input devices, video input devices, haptic input devices, devices for receiving wired or wireless data transmissions, etc.). The simplified computing device of FIG. 5 may also include other optional components, such as, for example, one or more conventional computer output devices 550 (e.g., display device(s) 555, audio output devices, video output devices, devices for transmitting wired or wireless data transmissions, etc.). Note that typical communications interfaces 530, input devices 540, output devices 550, and storage devices 560 for general-purpose computers are well known to those skilled in the art, and will not be described in detail herein.

The simplified computing device of FIG. 5 may also include a variety of computer readable media. Computer readable media can be any available media that can be accessed by computer 500 via storage devices 560 and includes both volatile and nonvolatile media that is either removable 570 and/or non-removable 580, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the problem signature extraction technique described herein, or portions thereof, may be stored, received, transmitted, or read from any desired combination of computer or machine readable media or storage devices and communication media in the form of computer executable instructions or other data structures.

Finally, the problem signature extraction technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for automatically learning problem signatures for an application using trace data from good executions and bad executions of the application, comprising:
    (a) extracting feature sets from the trace data of the executions of the application and assigning a coarse label of good to each feature set for good executions of the application and a coarse label of bad to each feature set for bad executions of the application;
    (b) inputting the coarsely labeled feature sets for the trace data into a decision tree classifier and attempting to build a decision tree comprising categorized problem signatures each identifying a type of problem with the application from trace data for bad executions of the application, wherein each type of problem is not predefined;
    (c) if the decision tree classifier yields a decision tree, finding all problem leaf nodes corresponding to bad executions in the decision tree;
    (d) for each problem leaf node in the decision tree finding all feature sets and their corresponding values in the path from root to each problem leaf node,
    (e) creating a new data set for each problem leaf node, consisting of all BAD feature sets that contributed to the problem leaf node, and all GOOD feature sets;
    (f) for all of these feature sets in the created new data set, removing these feature sets on the path from the root to each problem leaf node;
    (g) repeating (b) through (f) to form an aggregate tree until the decision tree classifier does not yield a decision tree; and
    (h) identifying each the remaining feature sets on each path from root to leaf node of the aggregate tree as a problem signature; and
    (i) outputting the identified problem signatures to be used for identifying problems with the execution of the application.

2. The computer-implemented process of claim 1, further comprising: inputting new trace data for a bad execution of the application
    matching a signature corresponding to the new trace with previously generated signatures; and
    using the matched signatures to identify a type of problem causing the bad execution of the application.

3. The computer-implemented process of claim 1 wherein the application is a networked application and the trace data is network trace data.

4. The computer-implemented process of claim 3, wherein the problem signatures are used to build a database of network problems indexed by the problem signatures.

5. The computer-implemented process of claim 3, wherein the problem signatures are used to aid network trouble shooting.

6. The computer-implemented process of claim 5, further comprising annotating the problem signatures with metadata corresponding to the problems.

7. The computer-implemented process of claim 3, wherein the features further comprise packet types.

8. The computer-implemented process of claim 3, wherein the features further comprise packet sequences.

9. The computer-implemented process of claim 3, wherein the features further comprise aggregate network features.

10. A computer-implemented process for automatically learning problem signatures using network traces, comprising:

> extracting feature sets from the network traces of executions of an application and assigning a coarse label of good or bad to each feature set for good and bad network traces for good and bad executions of the application, respectively;
>
> iteratively inputting the coarsely labeled feature sets for the network traces into a decision tree classifier and attempting to build a decision tree comprising categorized problem signatures each identifying a type of problem with the execution of the application from good and bad network traces until the decision tree classifier does not yield a decision tree, wherein the type of problem is not predefined; and
>
> outputting the problem signatures to be used for identifying problems with the execution of the application.

11. The computer-implemented process of claim 10, further comprising:

> inputting a new bad network trace for a network problem; and
>
> using the problem signatures to identify the type of problem.

12. The computer-implemented process of claim 10 wherein iteratively inputting the coarsely labeled feature sets for the network traces into a decision tree classifier in an attempt to yield a decision tree comprising categorized problem signatures each identifying a type of problem from good and bad network traces, further comprises:

> (a) if the decision tree classifier yields a decision tree, finding all problem leaf nodes corresponding to bad network traces in the decision tree;
> (b) for each problem leaf node in the decision tree finding all feature sets and their corresponding values in the path from root to each problem leaf node, and
> (c) creating a new data set for each problem leaf node, consisting of all BAD feature sets that contributed to that problem leaf node, and all GOOD feature sets;
> (d) for all of these feature sets in the created new data set, removing these feature sets on the path from the root to each problem leaf node;
> (e) repeating (a) through (d) to form an aggregate tree until the decision tree classifier does not yield a decision tree; and
> (f) identifying each the remaining feature sets on each path from root to leaf node of the aggregate tree as a problem signature; and
> (g) outputting the identified problem signatures to be used for identifying problems with the execution of the application.

13. The computer-implemented process of claim 10 wherein the decision tree classifier is a C4.5 decision tree classifier.

14. A system for automatically learning problems in an application, comprising:

> a general purpose computing device;
> a computer program comprising program modules executable by the general purpose computing device, wherein the computing device is directed by the program modules of the computer program to,
> identify features in traces for different types of application executions; and
> use the identified features in the traces of the application executions to construct problem signatures which classify problems with the application executions into categories which are not predefined for different types of application executions.

15. The system of claim 14, wherein the module to identify features further comprises sub-modules to:

> input traces of an applications communications with good executions of the application labeled as good and bad executions of the application labeled as bad; and
> extract a set of features from the traces.

16. The system of claim 15, wherein the module to use the identified features, further comprises modules to:

> use the traces labeled as good and bad and the set of features to build a classification tree that distinguishes between good and bad executions of the application and that also sub-classifies the bad executions into specific problem categories that are not predefined;
> use the classification tree to classify a problem from a newly input trace into a specific problem category; and
> apply a solution to the classified problem.

17. The system of claim 14 further comprising a module to search for the problem signatures in traces.

18. The system of claim 17 wherein the traces are divided into slices and the slices are searched for problem signatures.

19. The system of claim 17, wherein the problem signatures are used by a help desk application.

20. The system of claim 17, wherein the problem signatures are used to identify problems in a network.

* * * * *